United States Patent

Harada et al.

[19]

[11] Patent Number: 6,104,154
[45] Date of Patent: Aug. 15, 2000

[54] TRICYCLE WITH ELECTRIC MOTOR

[75] Inventors: Tomitaro Harada; Ryoji Iwakiri; Ichiro Kagawa, all of Osaka, Japan

[73] Assignee: Daiwa Sangyo Co., Ltd., Osaka, Japan

[21] Appl. No.: 09/306,763

[22] Filed: May 7, 1999

[30] Foreign Application Priority Data

Feb. 26, 1997 [JP] Japan ........................................ 9-60009
May 8, 1998 [JP] Japan ................................... 10-142157
Aug. 28, 1998 [JP] Japan ................................... 10-243023

[51] Int. Cl.$^7$ ...................................................... H02K 7/10
[52] U.S. Cl. ................................ 318/362; 318/9; 318/12; 318/14; 318/15; 280/255
[58] Field of Search .................................. 318/362, 9, 12, 318/14, 15; 280/255

[56] References Cited

U.S. PATENT DOCUMENTS 4,708,356 11/1987 Yamagiwa et al. ...................... 280/255
5,222,572 6/1993 Yamagiwa et al. ...................... 280/255
5,937,964 8/1999 Mayer et al. ............................ 280/255

FOREIGN PATENT DOCUMENTS 10243505 9/1998 Japan .

*Primary Examiner*—Karen Masih
*Attorney, Agent, or Firm*—Armstrong, Westerman, Hattori, McLeland & Naughton

[57] ABSTRACT

A tricycle with an electric motor in which two rear wheels 4 and 4 are driven by not only an electric motor 5, but also pedals 6 with manpower. A rotational force of the pedals 6 is transmitted to drive shaft 9 via first bevel gears 8*a* and 8*b* and then transmitted to a one-way clutch 7 via second bevel gears 10*a* and 10*b* from the drive shaft 9. The output of the one-way clutch 7 is then transmitted to the two rear wheels 4 and 4. The electric current to the electric motor is a pulse current and its pulse width is controlled to be shorted in relation to a braking operation.

9 Claims, 13 Drawing Sheets

TRICYCLE WITH ELECTRIC MOTOR

BACKGROUND OF THE INVENTION

(1) Field of the Invention

The present invention relates to a tricycle with an electric motor in which two rear wheels are driven not only by an electric motor while providing a battery but also driven by pedals with manpower, so as to use it as a passenger tricycle or a cart.

(2) Description of the Related Art

Today, an electric car provided with a battery which does not have problems of exhaust, and a so-called hybrid vehicle with a gasoline engine and an electric motor are being developed, in view of protection of the environment, as substitutions of a car provided with an internal combustion engine which emits combustion exhaust.

The trend has been toward a vehicle with an electric motor provided with a battery, such a bicycle, a tricycle, a van, and so on.

The above-mentioned bicycle and the tricycle are provided with batteries and electric motors with an intention to utilize electric power when a load is heavy, namely, at a time of starting, or of uphill ride, etc. The applicant of this invention has suggested an electric vehicle, in which a tricycle is driven by electricity, in Japanese patent application No. 9-60009.

In this invention, the object is an electric vehicle of a hybrid-type in which electric power is the main driving force and pedal drive is the subsidiary driving force.

The tricycle driven in the above-mentioned manner is basically constructed as follows. Namely, a front wheel is rotatably mounted on a front wheel frame and two rear wheels are mounted rotatably on a rear wheel frame. The rear wheel frame is mounted onto the front wheel frame to be rotatable about a lateral axis extending in forward and backward directions of the tricycle within a range of predetermined angles, so that it may easily turn the tricycle by inclining the front wheel frame on which a driver rides. Further, the two rear wheels are driven not only by an electric motor, but also by pedals with manpower, which pedals are mounted on the front wheel frame, via a one-way clutch.

The above-mentioned tricycle with an electric motor uses a chain drive system as power transmitting means, which was normally used for a bicycle, in order to drive the rear wheels by means of the pedals with manpower, as was in the above-mentioned Japanese patent application No. 9-60009.

The chain drive system had an advantage in that up-and-down relative movements of the front wheel frame and the rear wheel frame could be absorbed (Even if the both frames were rigid, the relative movements would rise due to flexible transformation of the frames.), but it had the following problems.

Namely, in the case of the tricycle which has a wide track compared to a bicycle, in order to make a small turn smoothly by using the two rear wheels which are not provided with inclining suspensions for wheels, there is no manner except that the rear wheel frame suspending the two rear wheels may be provided rotatably about a lateral axis extending in forward and backward directions within a range of predetermined angles, so as to incline or tilt the front wheel frame on which a driver rides. Although such a construction has been used in the prior art, where the front wheel frame is inclined sufficiently at angles of 10 to 20 degrees in order to make a small turn, it frequently causes the chain slip off of the sprockets.

If the inclination of the front wheel frame is minimally controlled in an attempt to prevent such trouble, the turning performance of the tricycle goes down greatly and a small turn cannot be smoothly carried out.

By the way, functional and structural advantages of a vehicle with an electric motor are that operation can be done only by controlling a starting switch of an electric motor, and that the structure is extremely simple. How the other structures necessary for running can be similarly simplified is at issue. In order to provide such simplification, also with regard to a brake mechanism, such systems separated from a driving system of the electric motor are adopted such as a hand brake which mechanically (a release wire, etc.) and directly works on wheels, a pressure-type brake (a type which is adopted by a front wheel of an ordinary bicycle, etc.), and a disc brake (a kind of a pressure-type).

By adopting the separated system with a simple structure such as mentioned above, a speed can be reduced only by operation of a brake lever while the starting switch (or an accelerator for adjusting a speed, voltage control, etc.) of the electric motor is left untouched, and a starting condition is restored only by releasing # the brake lever. Thus, the tricycle with the electric motor can be driven with an extremely simple operation.

In this invention, the following study on the tricycle with an electric motor was developed first, on the premise that the advantages of the vehicle adopting such a simple structural system is utilized.

Namely, the tricycle with an electric motor is constructed in which generating power of the electric motor is reduced to a necessary number of revolutions via a speed reducer, the generating power of the speed reducer is transmitted to two rear driving wheels via a transmission means, a one-way clutch is mounted to each of drive transmission systems between the speed reducer and the two driving rear wheels which drive transmission systems transmit only the generating power of the electric motor, and the two driving rear wheels are mechanically braked by operation of the brake lever.

The speed reducer is necessary for obtaining necessary torque for running (load carrying or traction) from a small-sized electric motor, and the tricycle is constructed to be a two-rear wheel drive because of the rear wheels which receive drive resistance (traction resistance) in a preferable form to make best use of the drive.

In the meantime, in the two-rear wheel system, when the tricycle makes a turn the tricycle does not turn smoothly unless the numbers of rotating of an inner wheel and an outer wheel differ due to the difference between the respective radii of the wheels.

The above-mentioned problem has been solved by driving the right and left wheels by use of a differential gear mechanism, however, since the differential gear mechanism is expensive, application of the same to this invention, whose object is a simple and inexpensive tricycle, raises costs.

According to this invention, as an alternative means to the above, the problem was solved by introducing a one-way clutch into each of the two wheels and by adopting a method of stoppage of the electric motor (brake of an electric current).

Namely, according to this invention, directing attention to the fact that the speed of the tricycle is reduced by operation of the brake when linear running is shifted to curve running, the brake lever and the switch of the electric motor are so interlocked that the electric current to the electric motor is broken when the brake lever is operated.

Thereby the speed of the tricycle is reduced by the brake lever, the drive of the electric motor is stopped at the same time, and the two wheels become free-wheeling. When a handlebar is turned under this condition, ground resistance of the inner wheel increases, however, since the two wheels are free-wheeling, necessary number of rotation of each of the right and left wheels can be obtained and smooth turning can be achieved.

Though smooth turning with simple operation and inexpensive structure are achievable by the above-mentioned introduction of the one way clutch to the two driving wheels and the adoption of the method of stoppage of the electric motor (brake of an electric current), a new problem, as mentioned below has occurred.

Namely, when the turning which is preformed by the above-mentioned operation finishes and linear running starts or when re-drive (acceleration) becomes necessary, it is difficult to obtain a condition of a smooth acceleration or a condition of a powerful drive even if electric current is resumed to the electric motor by releasing the brake, wherefore it becomes very difficult to revert from a curve running to a linear running, which therefore results in a problem in safety.

SUMMARY OF THE INVENTION

It is a first object of this invention to provide a tricycle with an electric motor which is superior in its turning performance while smoothly transmitting manpower despite inclination of a front wheel frame for a driver's seat.

A second object of this invention is to improve handling of the tricycle in connection with a turning operation.

In order to achieve the above first object, the tricycle with an electric motor of the present invention in which a front wheel is rotatably mounted on a front wheel frame, and two rear wheels are rotatably mounted on a rear wheel frame which is mounted on the front wheel frame to tilt about a substantially lateral axis extending in the forward and backward directions of the tricycle within a range of predetermined angles, and the two rear wheels are driven by an electric motor mounted on the rear wheel frame and also driven with manpower by means of pedals which are mounted on the front wheel frame via a one way clutch, said tricycle comprising first bevel gears connected to the pedals, drive means for transmitting a rotational force of the pedals via the first bevel gears, and second bevel gears connected to the one way clutch for transmitting the rotational force from the drive means, so as to transmit the rotational force of the one way clutch to the two rear wheels.

In the present invention, it is preferable that the drive means comprises a drive shaft or a wire cable.

Further, in the present invention, it is preferable that the tricycle further comprises a flexible thrust bearing mechanism (sometimes "called a loster" by its trade name) for supporting the front wheel frame rotatably with respect to the rear wheel frame within a range of predetermined angles, said flexible thrust bearing mechanism including a housing fixed to the rear wheel frame, a casing supported in the housing to be rotatable via a flexible body, and a flexible thrust bearing mechanism shaft holder engaged with the casing, wherein the drive shaft penetrates the casing and is supported by the flexible thrust bearing mechanism shaft holder via a bearing.

Furthermore, in the present invention, it is preferable that the tricycle further comprises first belt drive means, differential gears for receiving the rotational force from the electric motor via the first belt drive means, and second belt drive means for transmitting an output of the one way clutch to the differential gears.

To achieve the second object, the tricycle further comprises a speed reducer provided between the electric motor and the two rear wheels, two one-way clutches, each being provided between the speed reducer and the two rear wheels, so as to transmit only the output of the electric motor to the two rear wheels, a brake lever for mechanically braking the two rear wheels, an oscillator for generating a pulse current to drive the electric motor, a pulse width modulator, a controller for controlling the pulse width modulator to shorten a pulse width of the pulse current in relation to a braking operation of the brake lever, compared to a width of the pulse current in a state of normal drive and to return the pulse width of the pulse current to the pulse width in normal drive in relation to a brake release operation of the brake lever.

In the present invention, where the pulse width of the pulse current is controlled to be shorted, it is preferable to control the pulse width to share 10% to 5% of the pulse width in the state of normal drive.

According to the present invention, the tricycle which is driven by both electric power and manpower has an advantage of producing an excellent turning performance with a simple structural improvement while carrying out a sufficient manpower transmission. Therefore, the present invention prevents a chain used as drive means in the prior art from slipping off.

Further, by controlling a pulse width of the pulse current for driving the electric motor in relation to a braking operation of the brake lever to be short or long, it has an advantage of responsibility in re-acceleration after a speed reduction at the time of a turning operation, so as to easily operate and drive a tricycle.

The other advantages of the present invention will be apparent from the description of preferred embodiments based on the drawings which will be described in detail below.

BRIEF DESCRIPTION OF THE DRAWINGS

The drawings show preferred embodiments of a tricycle with an electric motor according to the present invention in which.

DETAILED DESCRIPTION OF PREFERRED EMBODIMENTS

Figure 1:
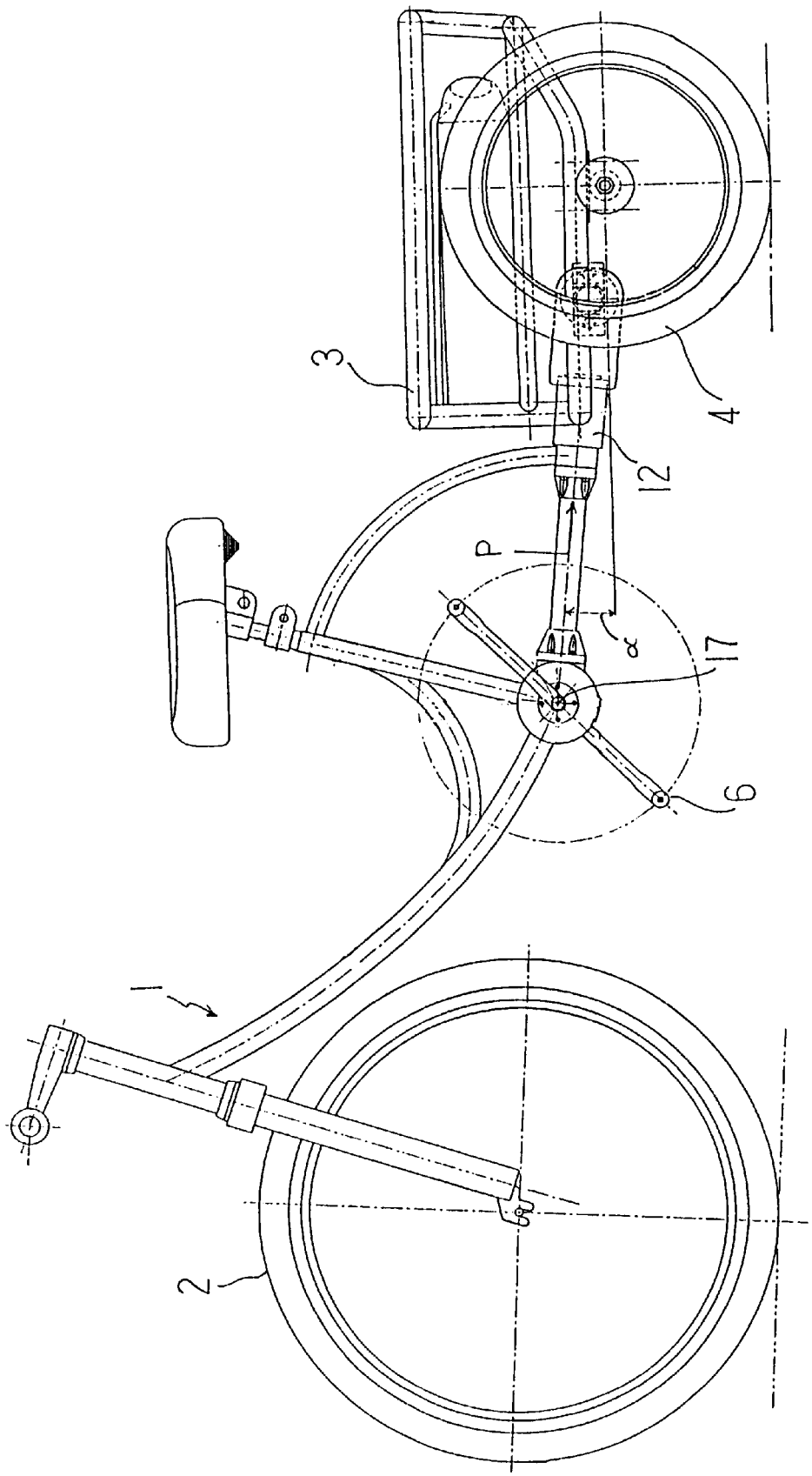
FIG. 1 is a side view of the tricycle according to the first embodiment.

The first embodiment of a tricycle with an electric motor according to the present invention will be described on the basis of the drawings. FIG. 1 is a side view of the tricycle with an electric motor and FIG. 2 is a sectional plan view of its drive system and FIG. 3 is a brief descriptional view of the drive system.

Figure 2:
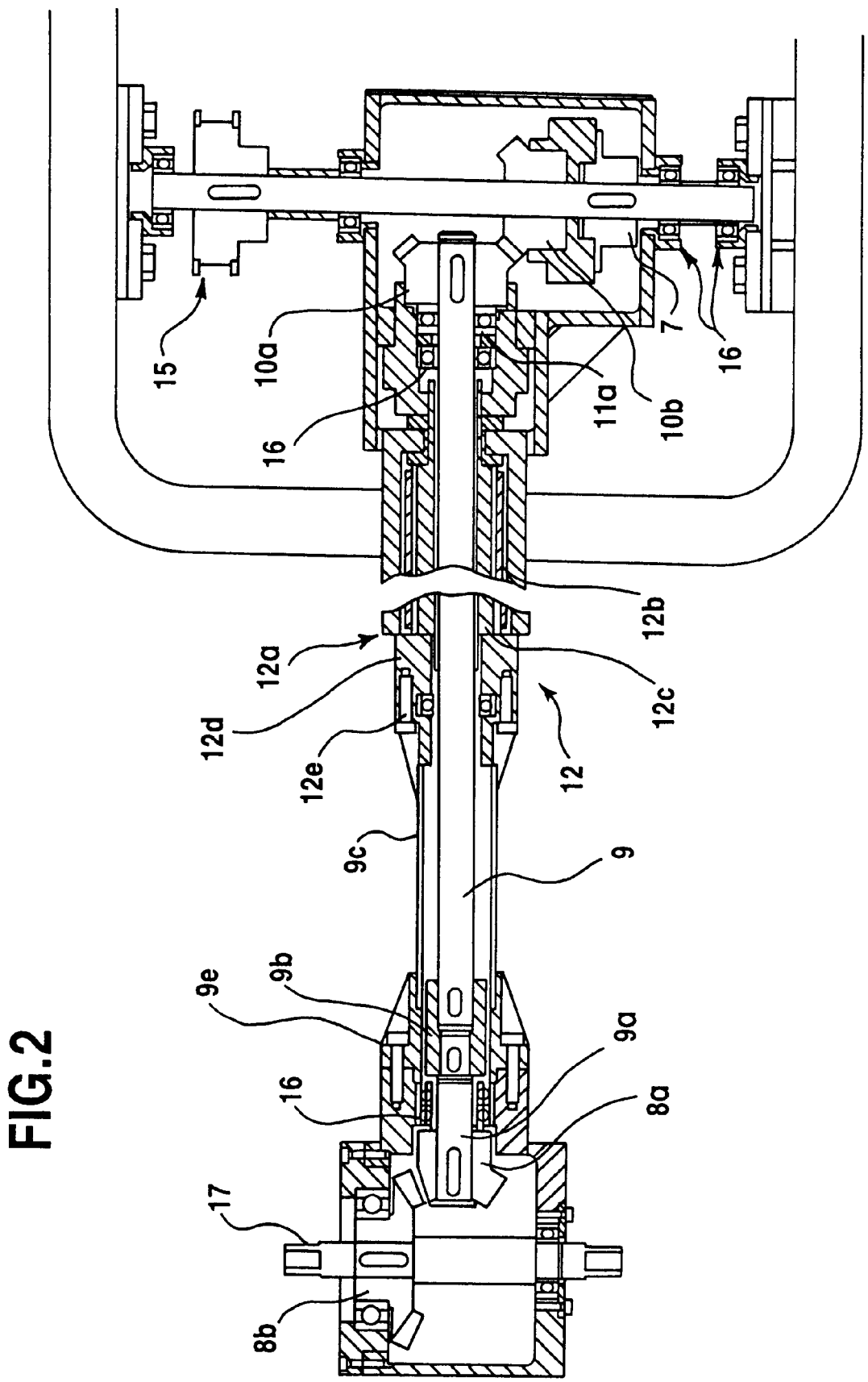
FIG. 2 is a sectional plan view of a drive system of the tricycle according to the first embodiment.
Figure 3:
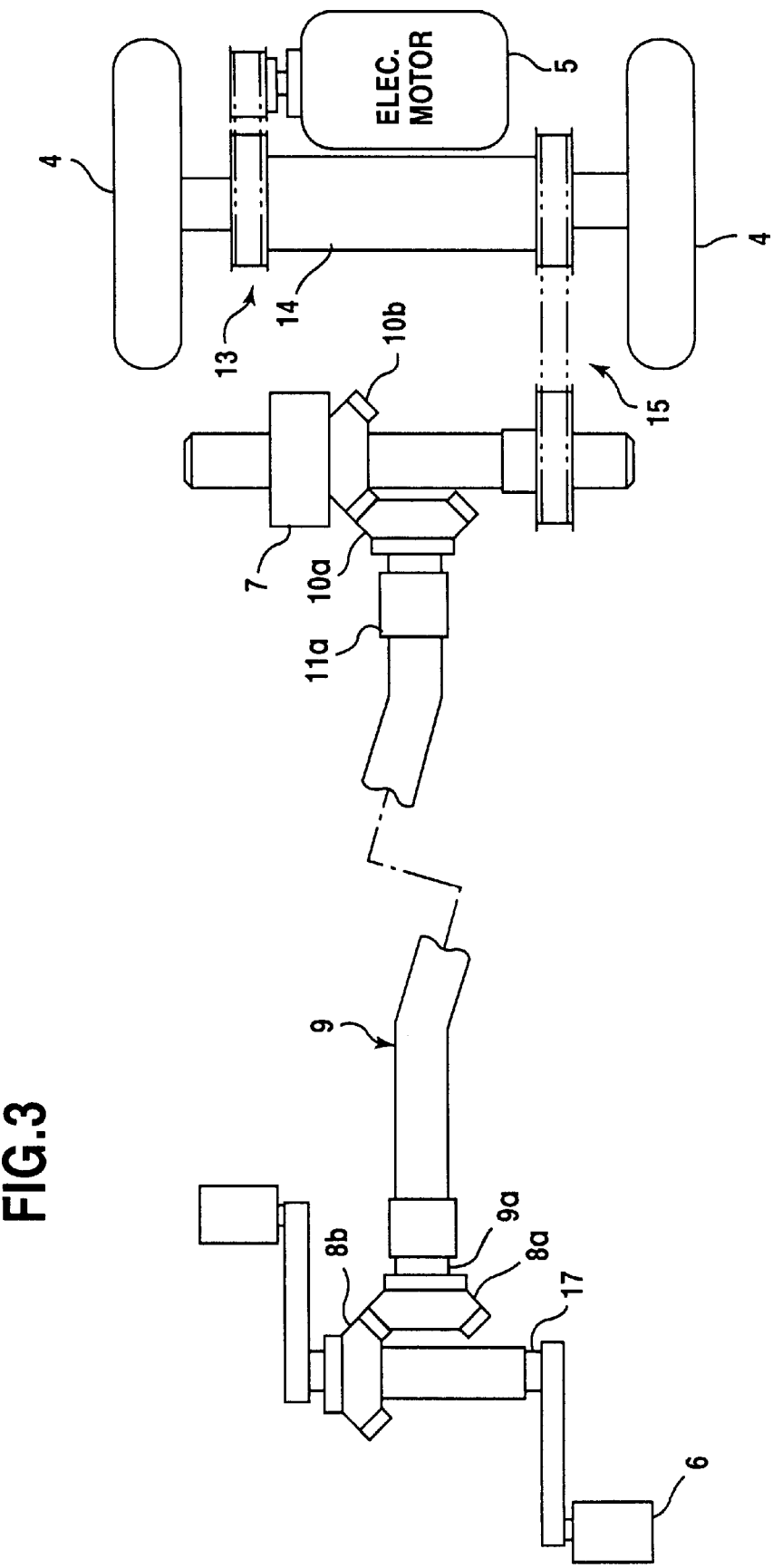
FIG. 3 is a brief description al view of the drive system of the tricycle according to the first embodiment.
Figure 4:
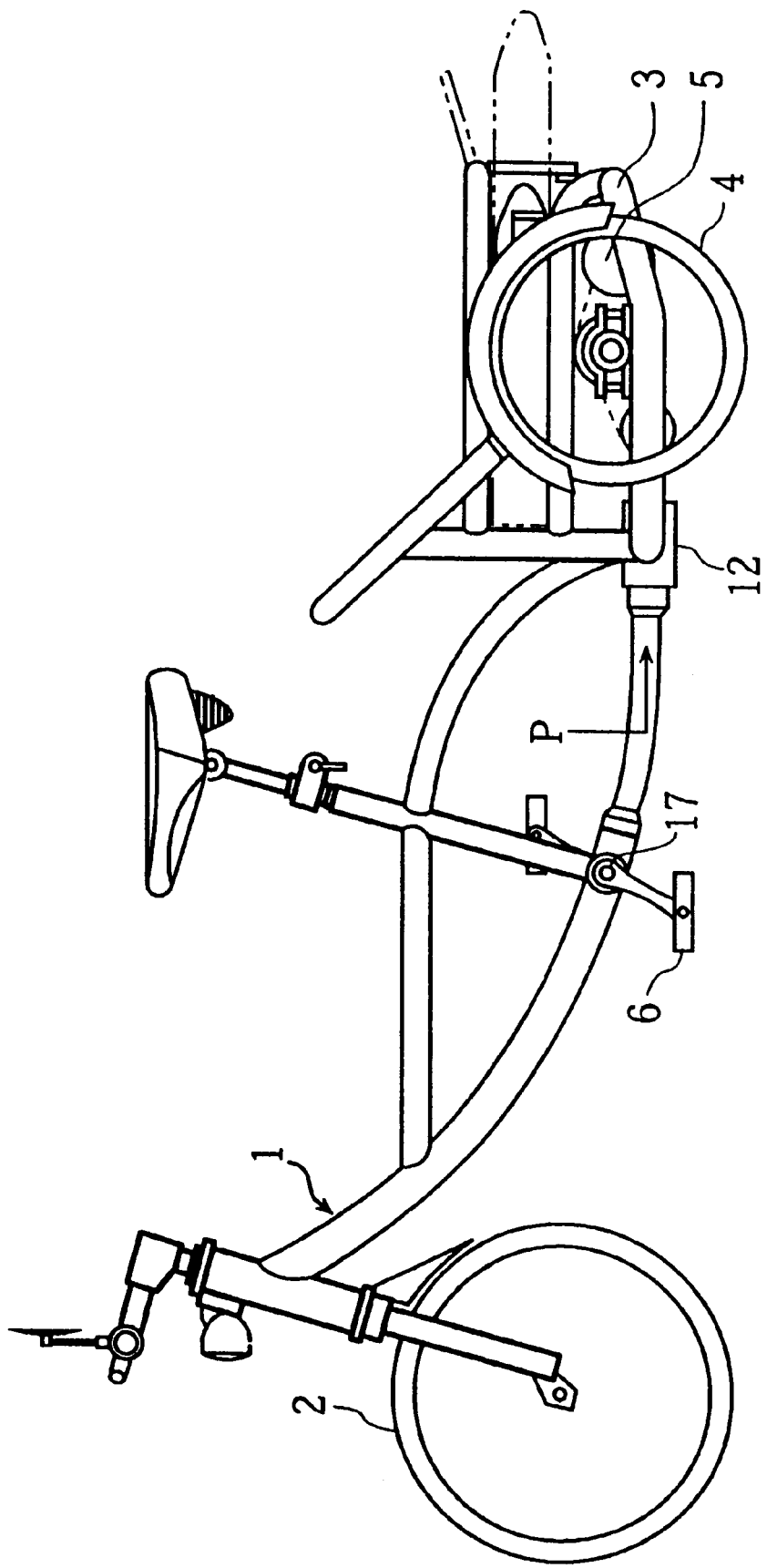
FIG. 4 is a side view of the tricycle according to the second embodiment.
Figure 5:
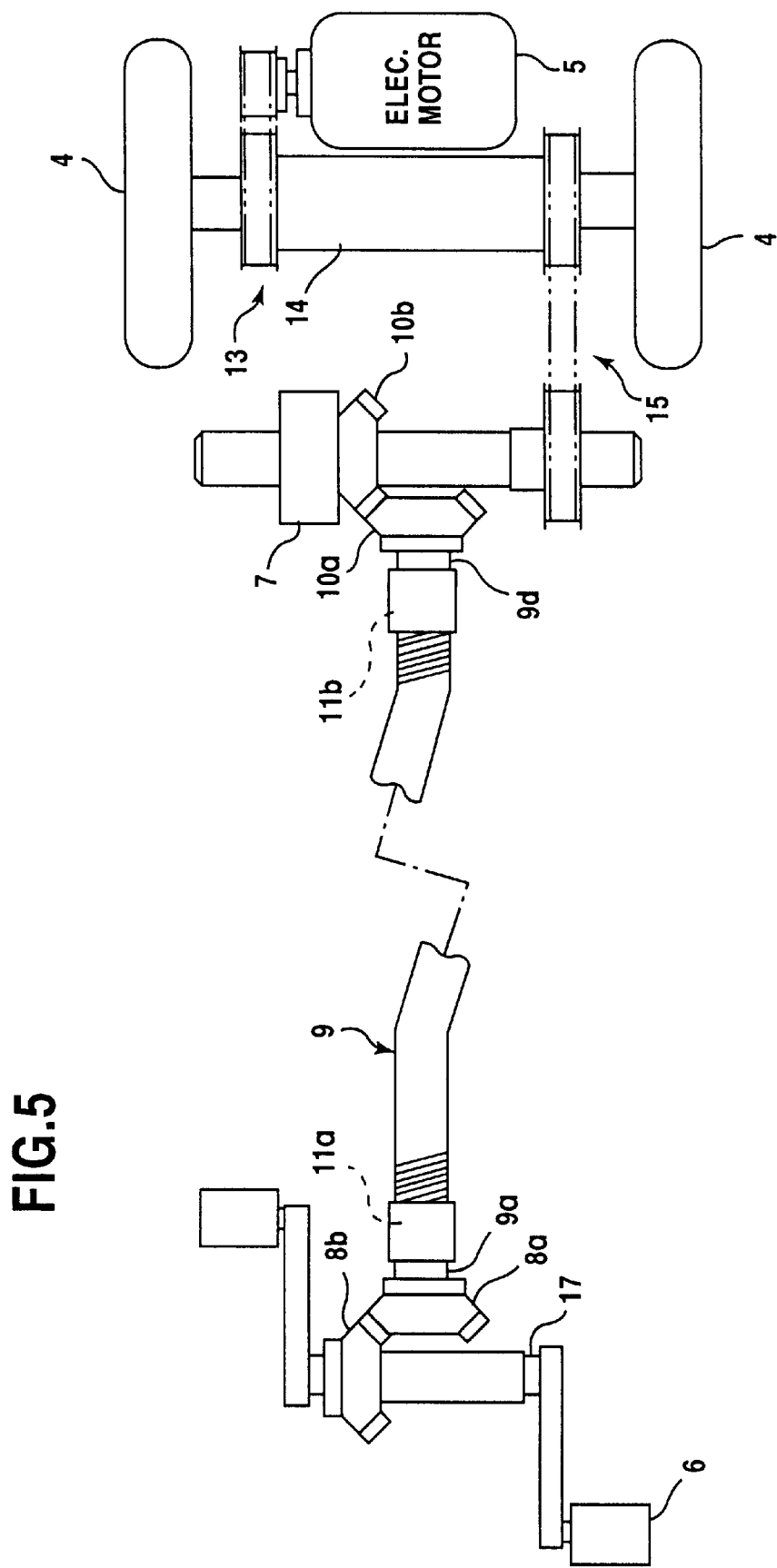
FIG. 5 is a plan view of a drive system of the tricycle according to the second embodiment.
Figure 6:
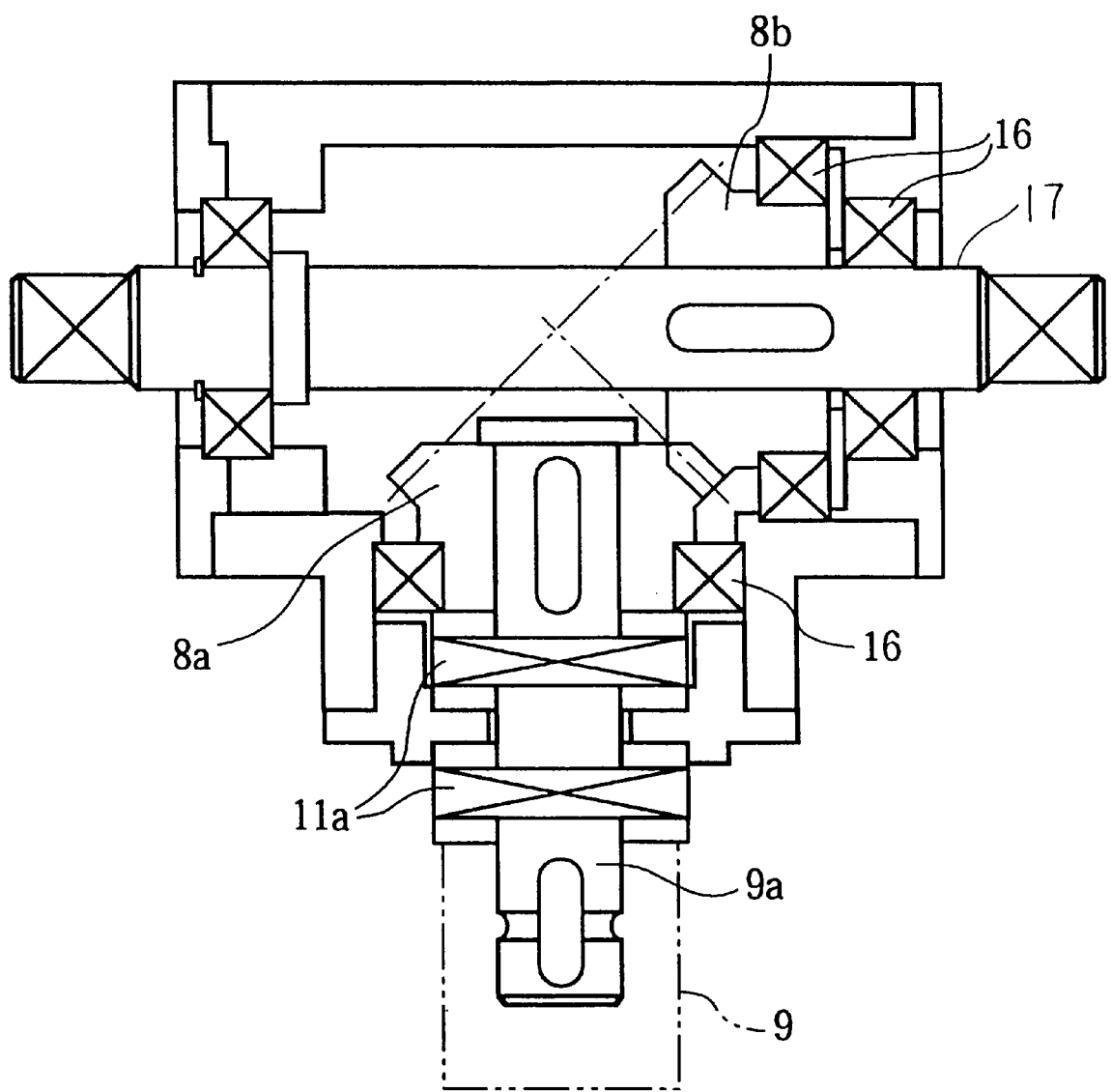
FIG. 6 is a sectional plan view of an essential part of the drive system of the tricycle according to the second embodiment.
Figure 7:
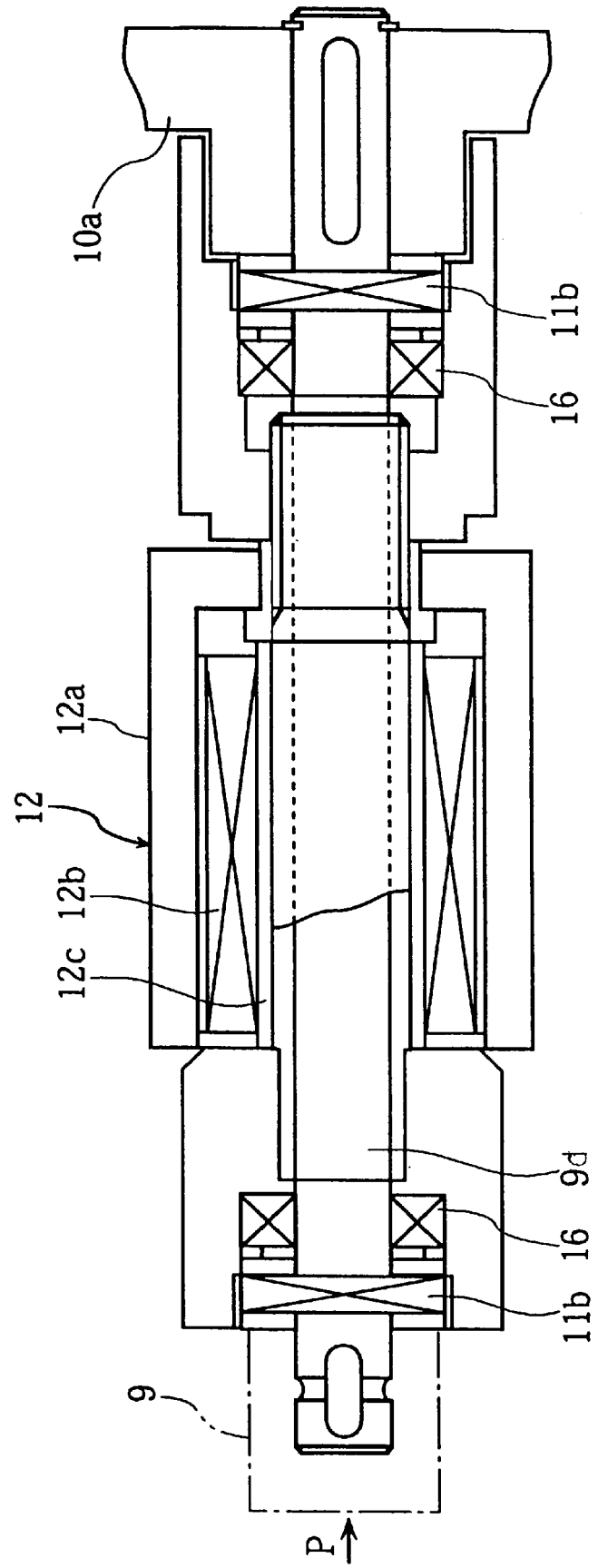
FIG. 7 is a sectional side view of a flexible thrust bearing mechanism of the tricycle according to the second embodiment.
Figure 8:
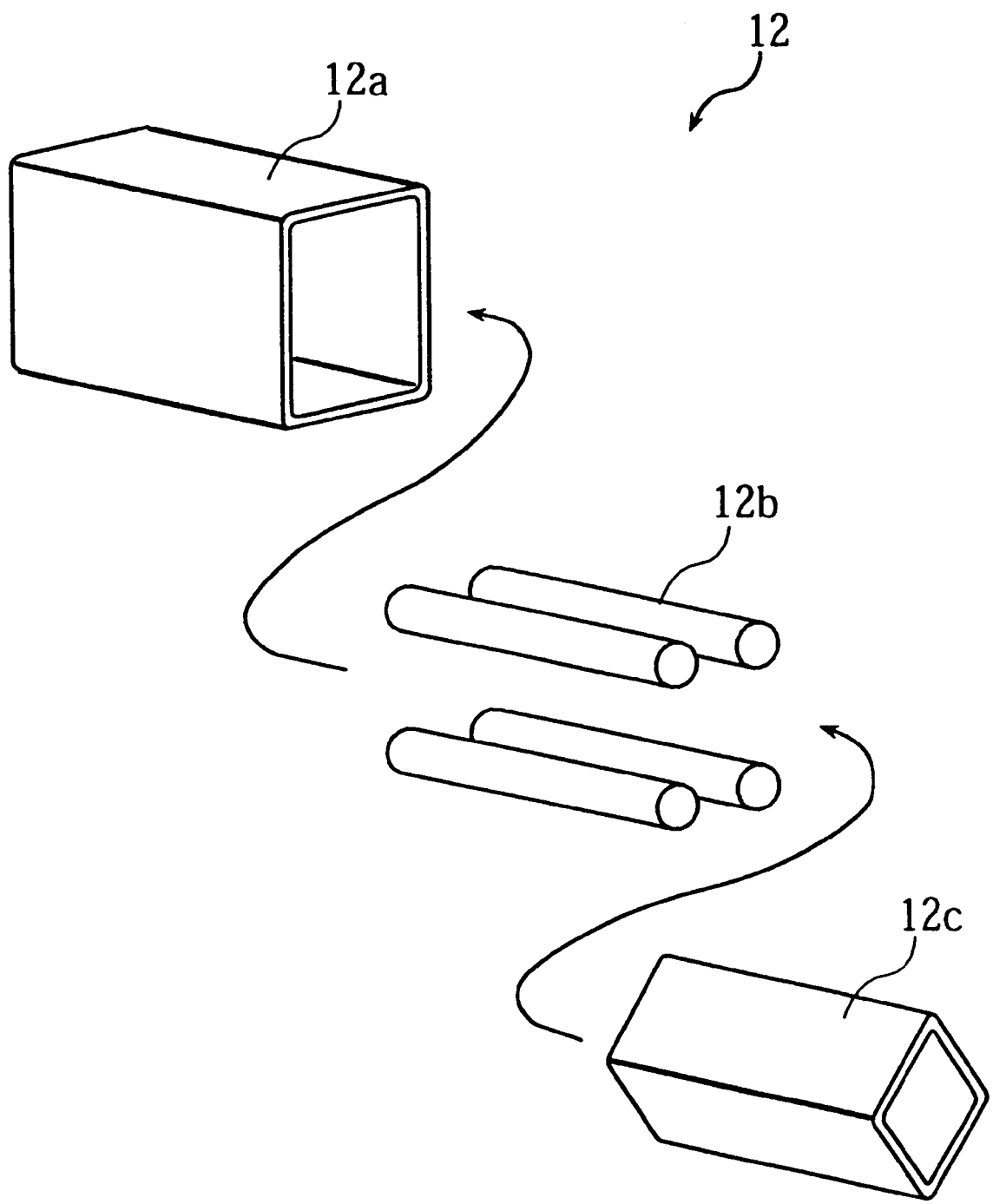
FIG. 8 is a disassembled perspective view of an essential part of the flexible thrust bearing mechanism of the tricycle according to the second embodiment.

As shown in FIGS. 1 through 3, the essential construction of the tricycle according to the present invention is that a front wheel 2 is rotatably mounted on a front wheel frame 1, and that two rear wheels 4 and 4 are rotatably mounted on a rear wheel frame 3. Further, the rear wheel frame 3 is mounted on the front wheel frame 1 to tilt about a substantially lateral axis P extending in the forward and backward directions of the tricycle within a range of predetermined angles, and the two rear wheels 4 and 4 are driven by an electric motor 5 mounted on the rear wheel frame 3 and also driven by pedals 6 with manpower which are mounted on the front wheel frame 1 via a one-way clutch 7.

In the present invention, first bevel gears 8a and 8a, are connected to the pedals 6, so that a rotational force of the pedals 6 is transmitted to drive means 9 as a drive shaft via the first bevel gears 8a and 8a. The rotational force is then transmitted from the drive shaft 9 to second bevel gears 10a and 10b via the one-way clutch 7. Therefore, when revolutions of the electric motor 5 exceeds revolutions of the pedals 6, it becomes possible to release its difference of the relative rotational speeds of the electric motor 5 and the pedals 6, by utilizing the one-way clutch 7. Namely, since the one way clutch 7 is provided with a drive system of the pedals 6, it is possible to use the one-way clutch 7 in a range of low speeds in comparison to such a case that the one-way clutch 7 is provided with a driving system of electric motor 5, and as a result, it may be possible to use the one-way lutch 7 for a long period of time by restraining frictional wear of the clutch.

The drive shaft 9 is inclined downwardly at an angle of inclination α, namely, at about 6 degrees in this embodiment, with respect to a substantially lateral axis P, and extending to the second bevel gears 10a and 10b. And, a thrust bearing 11a is provided for fixing backlash of the second bevel gear 10a which is fixed to the drive shaft 9.

Further, the first bevel gear 8a is fixed to an operation shaft 9a which is connected to the drive shaft 9 via a coupling 9b and a key.

The numeral 12 designates a flexible thrust bearing mechanism (sometimes called "a loster" by its trade name), which holds two members which are relatively rotatable, and its construction per se is well known in the field of this art. In this embodiment, a flexible thrust bearing mechanism 12 is provided for supporting the front wheel frame 1 rotatably with respect to the rear wheel frame 3 within a range of predetermined angles, so that the front wheel frame 1 is tilted or inclined at a landing point of the front wheel 2 as a fulcrum with respect to the rear wheel frame 3. To obtain such a function, the flexible thrust bearing mechanism 12 includes a housing 12a fixed to the rear wheel frame 3, a casing 12 supported in the housing 12a to be rotatable via a flexible body 12a, and a flexible thrust bearing mechanism shaft holder 12d engaged with the casing 12c, wherein the drive shaft 9 penetrates the casing 12c and is supported by the flexible thrust bearing mechanism shaft holder 12d via a bearing 12e.

An end of a shaft casing 9c is fit into the flexible thrust bearing mechanism shaft holder 12d and the other end thereof is fit into a flange 9e which is fixed by bolts to a bearing of the operation shaft 9a of the first bevel gear 8a, thereby the shaft casing may cover the drive shaft 9 so as to rotate relatively with respect to the housing 12a together with flexible thrust bearing mechanism shaft holder 12d and the casing 12c when the flexible thrust bearing mechanism 12 rotates.

As shown in FIG. 3, an output of the electric motor 5 is transmitted to differential gears 14 via first belt drive means 13 which comprises a belt and timing pulleys, and the output of the one-way clutch 7 is transmitted to the differential gears 14 via second belt drive means 15 which is constructed in the same manner as the first belt drive means 13.

Numeral 16 shows a ball bearing respectively and numeral 17 shows a crank shaft of the pedals 6.

In this embodiment, since the bevel gear mechanism is arranged in a narrow space near the crank shaft of the pedals 6, the first bevel gear 8a necessarily has a small diameter, but it is possible to use miter gears (engaging ratio 1 to 1). Contrary to this, it is, of course, possible to use bevel gears having a different engaging ratio instead of using the miter gears as the second bevel gear 10a.

Accordingly, by using the drive shaft 9 instead of a chain drive system, in the event that the front wheel frame 1 (driver's seat) is inclined sufficiently (10 to 20 degrees) and then the tricycle makes a small turn, it would not happen that a chain slips off from a sprocket as in the case of a chain drive system. Thus, a smooth and small turn may be carried out without troubles.

Further, by providing the flexible thrust bearing mechanism 12 having the flexible body 12b for holding the drive shaft 9 rotatably, it becomes possible to quickly carry out a returning action from the inclined posture of the front wheel frame 1 (returning of the driver's posture) by utilizing deformation and returning functions of the flexible body 12b at the time of relative rotation of the front wheel frame 1 with respect to the rear wheel frame 3 within a range of predetermined angles. As a result, it may quickly return the driver's posture to a normal driving posture so as to easily carry out driving operations.

As the construction of the flexible thrust bearing mechanism 12, since a middle portion of the drive shaft 9 in its longitudinal directions is supported, via the bearing 12e, by means of the flexible thrust bearing mechanism shaft holder 12d, which is fit into the casing 12c, it becomes possible not only to allow the above-mentioned relative rotation, but also to prevent vibration of the drive shaft 9 so as to smoothly carry out a small-radius turn of the tricycle.

Furtheremore since the output of the electric motor 5 is transmitted to the differential gears 14 via the first belt drive means 13, and the output of the one-way clutch 7 is transmitted to the differential gears 14 via the second belt drive means 15, when revolutions of the electric motor 5 exceeds revolutions of the pedals 6, it becomes possible to release its difference in the relative rotational speeds between the electric motor 5 and the pedals 6, by utilizing the one way clutch 7. Namely, since the one-way clutch 7 is provided with a drive system of the pedals 6, it is possible to use the one-way clutch 7 in a range of low speeds in comparison to a case such that the one-way clutch 7 is provided with a driving system of an electric motor 5, and as a result, it may possible to use the one-way clutch 7 for a long period of time by reducing frictional wear of the clutch.

By the way, in the present invention, it is possible to carry out change-over of driving and stopping by the electric motor 5, and drive by the pedals 5, on the basis of the rotational speed of the rear wheels or the speed of the tricycle, or its change-over may be carried out independently regardless of the revolution of the rear eels or the speed of the tricycle. Namely, it is not an essential point of this invention to choose which way is to be taken, and it may be chosen at discretion.

Next, the second embodiment of this invention will be described in detail with reference to the FIGS. 4 through 8, as follows.

The tricycle with an electric motor in this embodiment is constructed basically in the same manner as the first embodiment. Namely, the tricycle with an electric motor comprises a front wheel 2 rotatably mounted on a front wheel frame 1, and two rear wheels 4 and 4 rotatably mounted on a rear wheel frame 3 which is mounted on the front wheel frame 1 to tilt about a substantially lateral axis P extending in the forward and backward directions of the tricycle within a range of predetermined angles, and the two rear wheels 4 and 4 being driven by an electric motor 5 mounted on the rear wheel frame 3 and also driven by pedals 6 with manpower which pedals are mounted on the front wheel frame 1 via a one-way clutch 7.

It is constructed such that a rotational force of the pedals 6 is transmitted to a wire cable 9 as drive means via first bevel gears 8a and 8b, where are connected to the pedals 6. Although the wire cable 9 may be sufficient to transmit a rotational force of the pedals 6 it is not necessary to provide a universal joint in the case of a shaft drive system since the wire cable 9 per se has flexibility.

Revolution of the wire cable 9 is transmitted to the one-way clutch 7 via second bevel gears 10a and 10b and the output of the one-way clutch 7 is transmitted to the two rear wheels 4 and 4 via second belt drive means 15, which will be referred to hereinafter.

Therefore, when the revolution of the electric motor 5 exceeds that of the pedals 6, the one-way clutch 7 may release the difference in relative rotational speed between the electric motor 5 and the pedals 6. Namely, since the one-way clutch 7 is provided with a driving system of the pedals 6, it becomes possible to use the one-way clutch 7 in a range of low speeds in comparison to such a case that the one-way clutch 7 is provided with a driving system of electric motor 5, and as a result, it becomes possible to use the one-way clutch 7 for a long period of time while controlling frictional wear of the clutch.

Thrust bearings 11a and 11b are provided for fixing backlash of each of the first bevel gears 8a and the second bevel gear 10a which are fixed to operation shafts 9a and 9d, respectively, which are connected to the wire cable 9.

The operation shaft 9d connected to the wire cable 9 is supported by the rear wheel frame 3 via a flexible thrust bearing mechanism 12 to be rotatable within a range of predetermined angles. The flexible thrust bearing mechanism 12 comprises a housing 12a which is fixed to the rear wheel frame 3, and a casing 12c supported rotatably in the housing 12a via a flexible body 12b, and the operation shaft 9d penetrates the casing 12c.

Further, an output of the electric motor 5 is transmitted to differential gears 14 via first belt drive means 13, and the output of the one-way clutch 7 is transmitted to the differential gears 14 via second belt drive means, 15 which is constructed in the same manner as the first belt drive means 13. In this embodiment, the first bevel gears 8a and 8b and the second bevel gears 10a and 10b are miter gears, namely, each of their engaging ratios is 1 to 1.

In the drawing, the numerals 16 each designates a bearing and the numeral 17 shows a crank shaft of the pedals 6.

Next, a third embodiment of the present invention will be described in detail with reference to FIGS. 9 through 13.

The essential construction of a tricycle in this embodiment is basically the same as those of the first and second embodiments, and therefore description of the same parts thereof are omitted here.

An output of an electric motor 5 is reduced to have a predetermined revolution by means of a speed reducer 20, and the output of the speed reducer 20 is transmitted to two rear wheels 4 and 4 via drive means 9. Two one-way clutches 21a and 21b are interposed between the speed reducer 20 and the rear wheels 4 and 4 in order to transmit only the output of the electric motor 5 to the rear wheels 4 and 4.

Braking operation of the two rear wheels 4 and 4 are mechanically carried out by means of a brake lever 22, which is provided with a handle 26, using such as a release wire.

Figure 9:
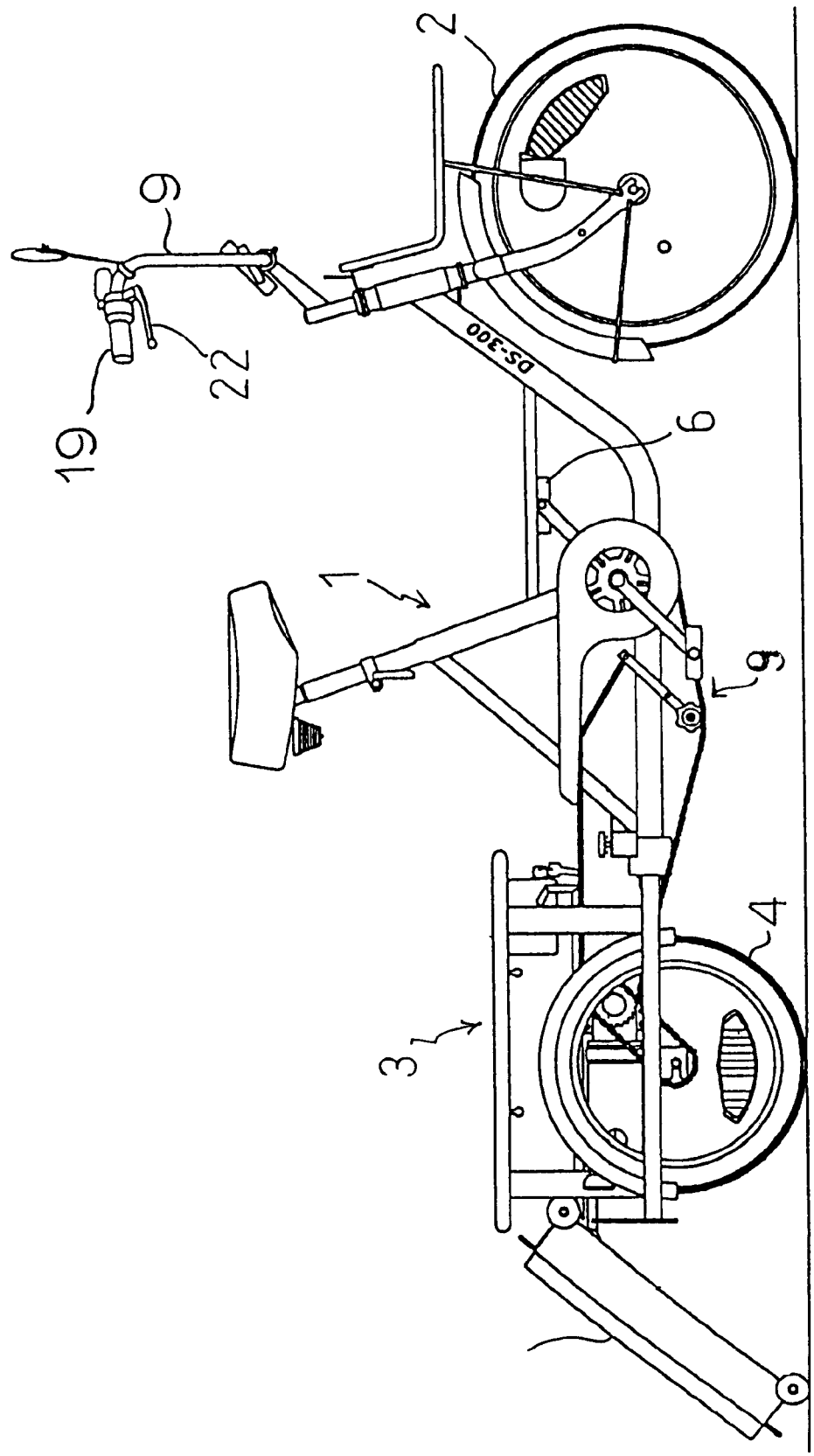
FIG. 9 is a side view of the tricycle according to the third embodiment.
Figure 10:
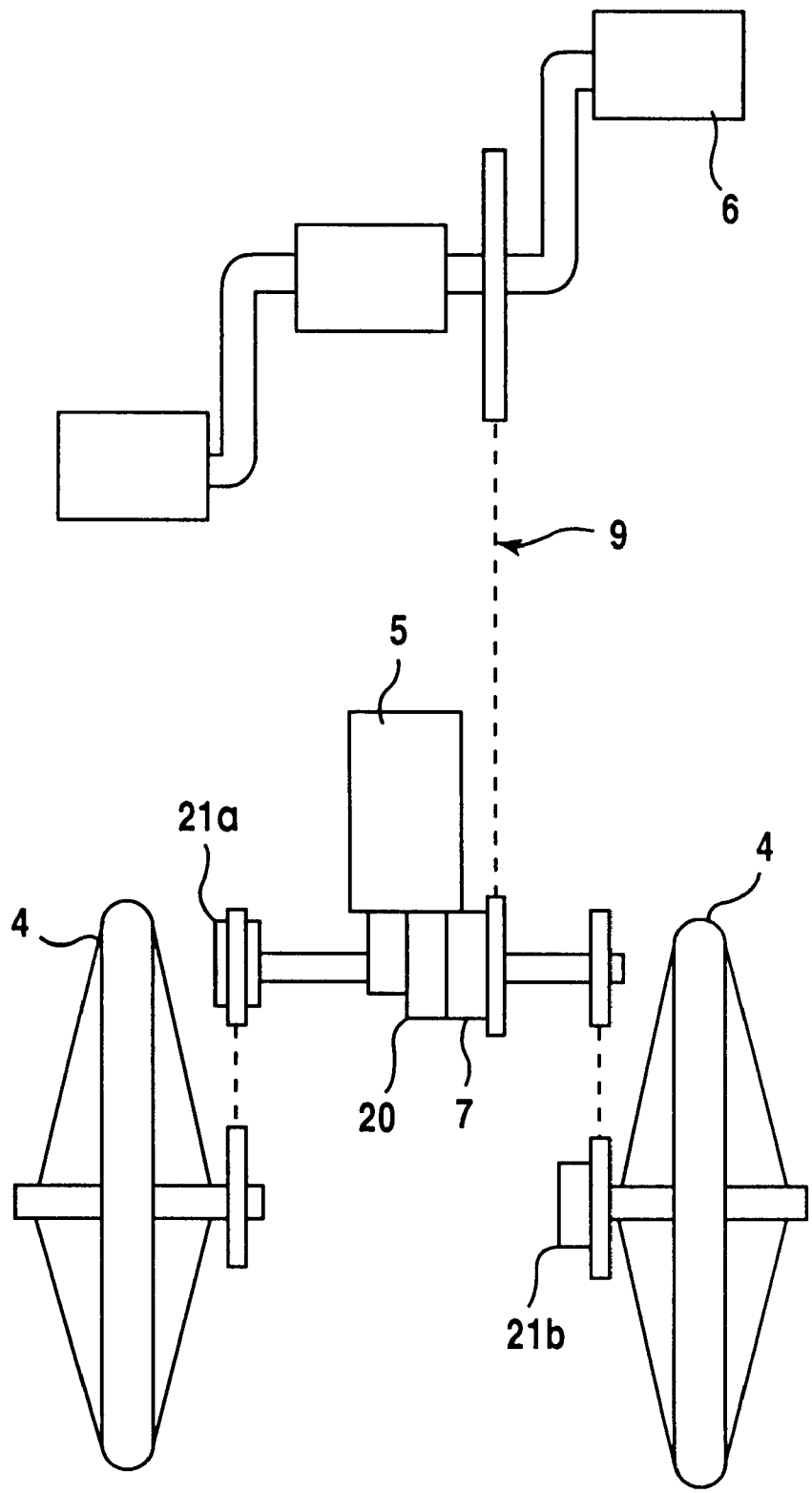
FIG. 10 is a sectional plan view of a drive system of the tricycle according to the third embodiment.
Figure 11:
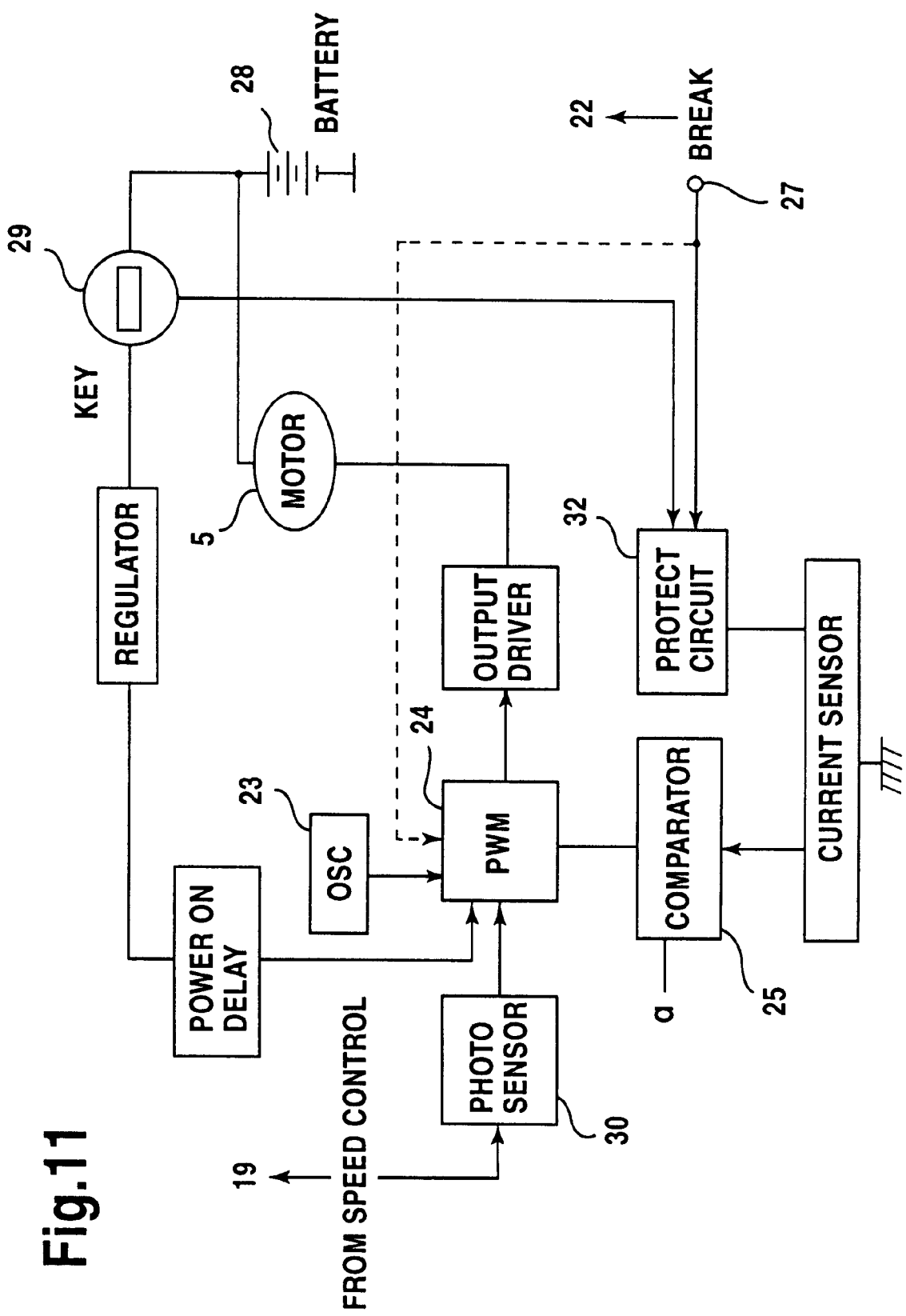
FIG. 11 is a block chart showing drive control of the tricycle according to the third embodiment.

As shown in FIG. 11, a controller 31 is provided with an oscillator 23 for generating a pulse current for driving the electric motor 5, a pulse width modulator 24 for modulating the pulse width, so as to shorten the pulse width of the pulse current in relation to a braking operation of the brake lever 22, comparing to a pulse width of the pulse current in the state of normal drive, and to return the pulse width of the pulse current to have the width in the state of normal drive in relation to a release operation of the brake lever 22. FIG. 11 shows a block chart of a circuit of the controller 31, and 29 indicates a switch. 25 shows a comparator. 19 shows a connection to an accel lever or grip. 27 indicates a terminal connected to the brake lever 22. 28 is a battery for driving the electric current 5, and this battery 28 is took off from the tricycle, as shown in FIG. 9. 30 indicates a photosensor which is connected to the accel lever or grip 19, so as to detect a variation of an amount of light which is generated with rotation of the accel lever or grip 19, and then change the variation to an electric signal in order to input the signal to the pulse width modulator 24.

Figure 12:
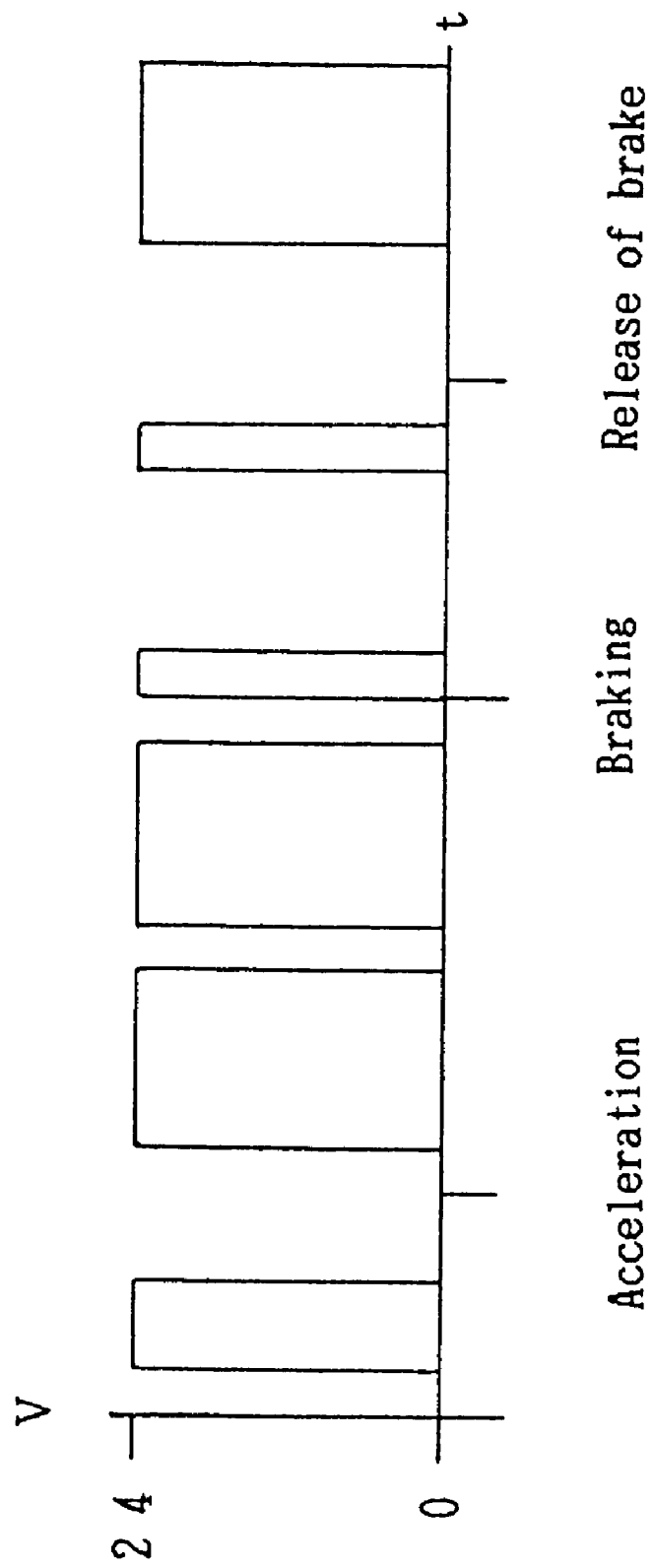
FIG. 12 is a pulse chart showing drive control of the tricycle according to the third embodiment.

As shown in FIG. 12, the above-mentioned control is carried out to share the pulse width within a range of 10 to 50 percentages of the pulse width in the state of normal drive.

Figure 13:
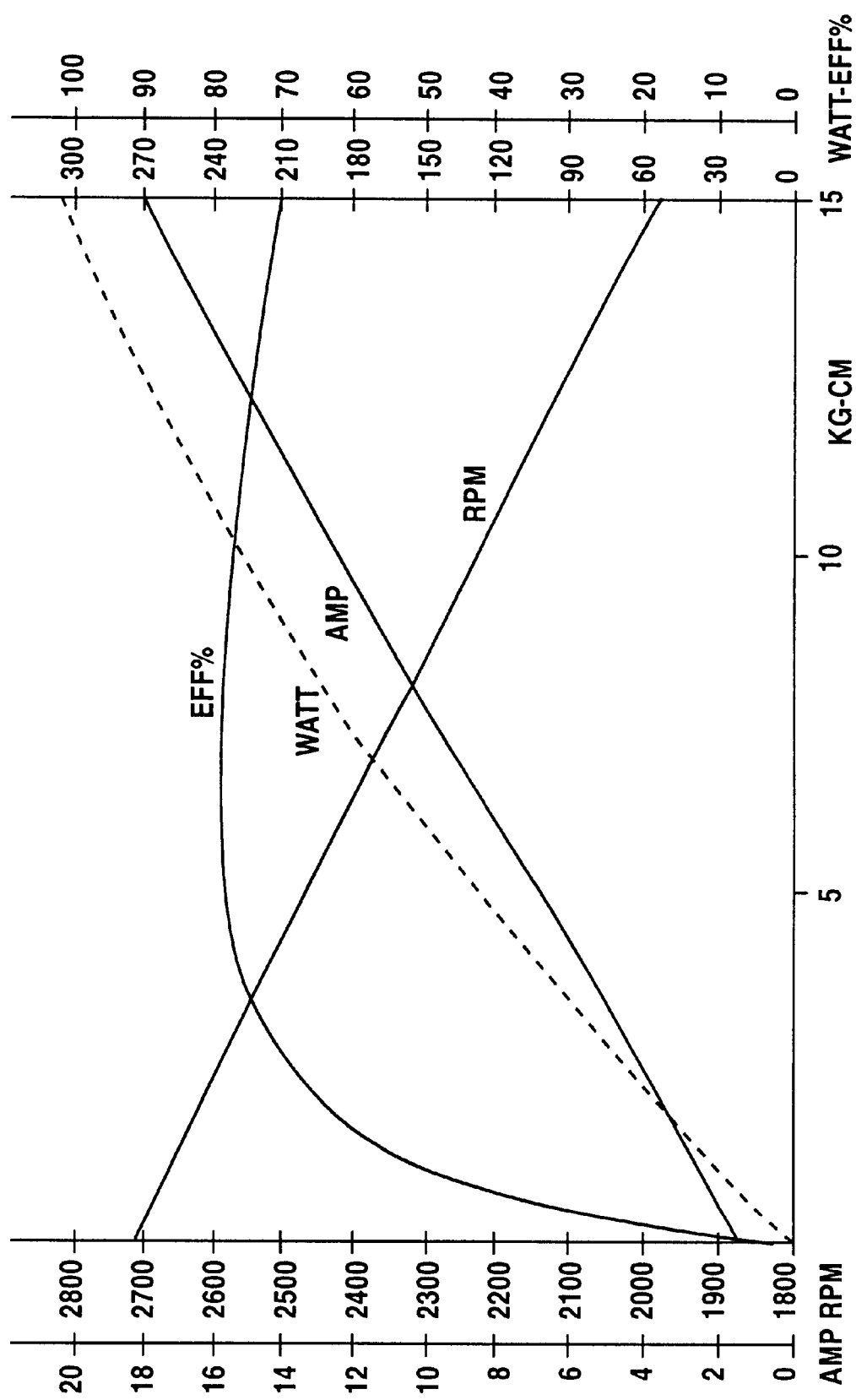
FIG. 13 is a graph showing a performance of an electric motor controlled of the tricycle according to the third embodiment.

FIG. 13 is a graph showing characters of relationship between electric power consumption and revolution and, etc., at the time of controlling the electric motor 5.

What is claimed is:

1. A tricycle with an electric motor in which a front wheel (2) is rotatably mounted on a front wheel frame (1), and two rear wheels (4) and (4) are rotatably mounted on a rear wheel frame (3) which is mounted on the front wheel frame (1) to tilt about a substantially lateral axis (P) extending in the forward and backward directions of the tricycle within a range of predetermined angles, and the two rear wheels (4)

and (4) are driven by an electric motor (5) mounted on the rear wheel frame (3) and also driven by pedals (6) with manpower which are mounted on the front wheel frame (1) via a one-way clutch (7), said tricycle comprising:

first bevel gears (8a) and (8a), connected to the pedals (6);

drive means for transmitting a rotational force of the pedals (6) via the first bevel gears (8a) and (8a); and second bevel gears (10a) and (10a), connected to the one-way clutch (7) for transmitting the rotational force from the drive means, so as to transmit the rotational force of the one-way clutch (7) to the two rear wheels (4) and (4), wherein the drive means comprises a drive shaft (9), further comprising a flexible thrust bearing mechanism (12) for supporting the front wheel frame (1) rotatably with respect to the rear wheel frame (3) within a range of predetermined angles, said flexible thrust bearing mechanism (12) including a housing (12a) fixed to the rear wheel frame (3), a casing (12) supported in the housing (12a) to be rotatable via a flexible body (12a), and a flexible thrust bearing mechanism shaft holder (12d) engaged with the casing (12c), wherein the drive shaft (9) penetrates the casing (12c) and is supported by the flexible thrust bearing mechanism shaft holder (12d) via a bearing (12e).

2. The tricycle with an electric motor as defined in claim 1, further comprising:

first belt drive means (13);

differential gears (14) for receiving the rotational force from the electric motor (5) via the first belt drive means 13; and second belt drive means (15) for transmitting an output of the one-way clutch (7) to the differential gears (14).

3. The tricycle with an electric motor as defined in claim 2, further comprising:

first belt drive means (13);

differential gears (14) for receiving the rotational force from the electric motor (5) via the first belt drive means (13); and second belt drive means (15) for transmitting an output of the one-way clutch (7) to the differential gears (14).

4. The tricycle with an electric motor as defined in claim 1, further comprising:

a speed reducer (20) provided between the electric motor (5) and the two rear wheels (4) and (4);

two one-way clutches (21a) and (21b), each being provided between the speed reducer (20) and the two rear wheels (4) and (4), so as to transmit only the output of the electric motor (5) to the two rear wheels (4) and (4);

a brake lever (22) for mechanically braking the two rear wheels (4) and (4), an oscillator (23) for generating a pulse current to drive the electric motor (5);

a pulse width modulator (24); and a controller (31) for controlling the pulse width modulator (24) to shorten a pulse width of the pulse current in relation to a braking operation of the brake lever (22), comparing to a width of the pulse current in a state of normal drive and to return the pulse width of the pulse current to the pulse width in normal drive in relation to a brake release operation of the brake lever (22).

5. The tricycle with an electric motor as defined in claim 4, wherein the pulse width is controlled to share 10 to 50% of the pulse width in the state of normal drive when the pulse width of the pulse current is controlled to be shorted.

6. The tricycle with an electric motor as defined in claim 1, further comprising:

a speed reducer (20) provided between the electric motor (5) and the two rear wheels (4) and (4);

two one-way clutches (21a) and (21b), each being provided between the speed reducer (20) and the two rear wheels (4) and (4), so as to transmit only the output of the electric motor 5 to the two rear wheels (4) and (4);

a brake lever (22) for mechanically braking the two rear wheels (4) and (4), an oscillator (23) for generating a pulse current to drive the electric motor (5);

a pulse width modulator (24); and a controller (31) for controlling the pulse width modulator (24) to shorten a pulse width of the pulse current in relation to a braking operation of the brake lever (22), comparing to a width of the pulse current in a state of normal drive and to return the pulse width of the pulse current to the pulse width in normal drive in relation to a brake release operation of the brake lever (22).

7. The tricycle with an electric motor as defined in claim 6, wherein the pulse width is controlled to share 10 to 50% of the pulse width in the state of normal drive when the pulse width of the pulse current is controlled to be shorted.

8. The tricycle with an electric motor as defined in claim 3, further comprising:

a speed reducer (20) provided between the electric motor (5) and the two rear wheels (4) and (4);

two one-way clutches (21a) and (21b), each being provided between the speed reducer (20) and the two rear wheels (4) and (4), so as to transmit only the output of the electric motor (5) to the two rear wheels (4) and (4);

a brake lever (22) for mechanically braking the two rear wheels (4) and (4), an oscillator (23) for generating a pulse current to drive the electric motor (5);

a pulse width modulator (24); and a controller (31) for controlling the pulse width modulator (24) to shorten a pulse width of the pulse current in relation to a braking operation of the brake lever (22), comparing to a width of the pulse current in a state of normal drive and to return the pulse width of the pulse current to the pulse width in normal drive in relation to a brake release operation of the brake lever (22).

9. The tricycle with an electric motor as defined in claim 8, wherein the pulse width is controlled to share 10 to 50% of the pulse width in the state of normal drive when the pulse width of the pulse current is controlled to be shorted.

* * * * *